United States Patent
Rowe (10) Patent No.: US 7,831,047 B2
(45) Date of Patent: *Nov. 9, 2010

(54) DIGITAL IDENTIFICATION OF UNIQUE GAME CHARACTERISTICS

(75) Inventor: Richard E. Rowe, Reno, NV (US)

(73) Assignee: IGT, Reno, NV (US)

(*) Notice: Subject to any disclaimer, the term of this patent is extended or adjusted under 35 U.S.C. 154(b) by 988 days.

This patent is subject to a terminal disclaimer.

(21) Appl. No.: 11/486,760

(22) Filed: Jul. 14, 2006

(65) Prior Publication Data

US 2006/0256965 A1    Nov. 16, 2006

Related U.S. Application Data

(63) Continuation of application No. 09/927,313, filed on Aug. 6, 2001, now Pat. No. 7,162,036.

(51) Int. Cl.
G06F 12/00 (2006.01)
A63F 9/24 (2006.01)

(52) U.S. Cl. ................. 380/251; 463/29; 713/180

(58) Field of Classification Search .......... 463/29; 380/251; 713/180
See application file for complete search history.

(56) References Cited

U.S. PATENT DOCUMENTS

| | | |
|---|---|---|
| 3,825,905 A | 7/1974 | Allen, Jr. |
| 3,838,264 A | 9/1974 | Maker |
| 3,931,504 A | 1/1976 | Jacoby |
| 4,072,930 A | 2/1978 | Lucero et al. |
| 4,193,131 A | 3/1980 | Lennon et al. |
| 4,200,770 A | 4/1980 | Hellman et al. |

(Continued)

FOREIGN PATENT DOCUMENTS

DE    3700861    7/1988

(Continued)

OTHER PUBLICATIONS

Answer and Counterclaims to Second Amended Complaint filed in connection with Civil Action No. CV-S-0 1-1498, pp. 1-26 and certificate of service page.

(Continued)

*Primary Examiner*—Michael Pyzocha
*Assistant Examiner*—Tamara Teslovich
(74) *Attorney, Agent, or Firm*—Weaver Austin Villeneuve & Sampson LLP (57) ABSTRACT

Various techniques are disclosed for authenticating a first gaming application adapted for deployment at a first gaming machine that is operable to receive a wager on a game of chance. A first gaming application signature is accessed. In at least one embodiment, the first gaming application signature is associated with a first portion of a first plurality of gaming objects that are associated with the first gaming application. A first certified gaming signature associated with the first gaming application may also be accessed. Authentication of the first gaming application may be performed. In at least one embodiment, the first gaming application may be authenticated, for example, by comparing at least one gaming application signature with at least one certified gaming signature. If it is determined that the first gaming application is not authentic, the first gaming application signature may be analyzed to identify at least one invalid gaming object.

32 Claims, 6 Drawing Sheets

U.S. PATENT DOCUMENTS

| | | |
|---|---|---|
| 4,218,582 A | 8/1980 | Hellman et al. |
| 4,335,809 A | 6/1982 | Wain |
| 4,354,251 A | 10/1982 | Hellwig et al. |
| 4,355,390 A | 10/1982 | Hellwig et al. |
| 4,405,829 A | 9/1983 | Rivest et al. |
| 4,430,728 A | 2/1984 | Beitel et al. |
| 4,454,594 A | 6/1984 | Heffron et al. |
| 4,458,315 A | 7/1984 | Uchenick |
| 4,462,076 A | 7/1984 | Smith, III |
| 4,467,424 A | 8/1984 | Hedges et al. |
| 4,494,114 A | 1/1985 | Kaish et al. |
| 4,519,077 A | 5/1985 | Amin |
| 4,525,599 A | 6/1985 | Curran et al. |
| 4,558,413 A | 12/1985 | Schmidt |
| 4,582,324 A | 4/1986 | Koza et al. |
| 4,607,844 A | 8/1986 | Fullerton |
| 4,652,998 A | 3/1987 | Koza et al. |
| 4,658,093 A | 4/1987 | Hellman |
| 4,727,544 A | 2/1988 | Brunner et al. |
| 4,752,068 A | 6/1988 | Endo |
| 4,759,064 A | 7/1988 | Chaum |
| 4,788,637 A | 11/1988 | Tamaru |
| 4,817,140 A | 3/1989 | Chandra et al. |
| 4,837,728 A | 6/1989 | Barrie et al. |
| 4,845,715 A | 7/1989 | Francisco |
| 4,848,744 A | 7/1989 | Steininger et al. |
| 4,856,787 A | 8/1989 | Itkis |
| 4,865,321 A | 9/1989 | Nakagawa et al. |
| 4,911,449 A | 3/1990 | Dickinson et al. |
| 4,930,073 A | 5/1990 | Cina, Jr. |
| 4,944,008 A | 7/1990 | Piosenka et al. |
| 4,951,149 A | 8/1990 | Faroudja |
| 5,004,232 A | 4/1991 | Wong et al. |
| 5,021,772 A | 6/1991 | King et al. |
| 5,042,809 A | 8/1991 | Richardson |
| 5,050,212 A | 9/1991 | Dyson |
| 5,103,081 A | 4/1992 | Fisher et al. |
| 5,109,152 A | 4/1992 | Takagi et al. |
| 5,146,575 A | 9/1992 | Nolan |
| 5,155,680 A | 10/1992 | Wiedener |
| 5,155,768 A | 10/1992 | Matsuhara |
| 5,161,193 A | 11/1992 | Lampson et al. |
| 5,179,517 A | 1/1993 | Sarbin |
| 5,224,160 A | 6/1993 | Paulini et al. |
| 5,235,642 A | 8/1993 | Wobber et al. |
| 5,259,613 A | 11/1993 | Marnell |
| 5,276,735 A | 1/1994 | Boebert et al. |
| 5,283,734 A | 2/1994 | Yon Kohorn |
| 5,288,978 A | 2/1994 | Iijima |
| 5,291,585 A | 3/1994 | Sato et al. |
| 5,297,205 A | 3/1994 | Audebert et al. |
| 5,326,104 A | 7/1994 | Pease |
| 5,342,047 A | 8/1994 | Heidel et al. |
| 5,343,527 A | 8/1994 | Moore |
| 5,398,932 A | 3/1995 | Eberhardt et al. |
| 5,421,006 A | 5/1995 | Jablon et al. |
| 5,465,364 A | 11/1995 | Lathrop et al. |
| 5,475,753 A | 12/1995 | Barbara et al. |
| 5,488,702 A | 1/1996 | Byers et al. |
| 5,489,095 A | 2/1996 | Goudard et al. |
| 5,507,489 A | 4/1996 | Reibel et al. |
| 5,586,766 A | 12/1996 | Forte et al. |
| 5,586,937 A | 12/1996 | Menashe |
| 5,604,801 A | 2/1997 | Dolan et al. |
| 5,611,730 A | 3/1997 | Weiss |
| 5,643,086 A | 7/1997 | Alcorn et al. |
| 5,644,704 A | 7/1997 | Pease et al. |
| 5,655,961 A | 8/1997 | Acres et al. |
| 5,655,965 A | 8/1997 | Takemoto et al. |
| 5,668,945 A | 9/1997 | Ohba et al. |
| 5,702,304 A | 12/1997 | Acres et al. |
| 5,704,835 A | 1/1998 | Dietz, II |
| 5,707,286 A | 1/1998 | Carlson |
| 5,725,428 A | 3/1998 | Achmuller |
| 5,737,418 A | 4/1998 | Saffari et al. |
| 5,741,183 A | 4/1998 | Acres et al. |
| 5,742,616 A | 4/1998 | Torreiter et al. |
| 5,742,829 A | 4/1998 | Davis |
| 5,745,569 A | 4/1998 | Moskowitz et al. |
| 5,752,882 A | 5/1998 | Acres et al. |
| 5,758,875 A | 6/1998 | Giacalone, Jr. |
| 5,759,102 A | 6/1998 | Pease et al. |
| 5,761,647 A | 6/1998 | Boushy |
| 5,768,382 A | 6/1998 | Schneier et al. |
| 5,800,268 A | 9/1998 | Molnick |
| 5,800,269 A | 9/1998 | Holch et al. |
| 5,809,251 A | 9/1998 | May |
| 5,812,857 A | 9/1998 | Nelson |
| 5,820,459 A | 10/1998 | Acres et al. |
| 5,823,874 A | 10/1998 | Adams |
| 5,836,817 A | 11/1998 | Acres et al. |
| 5,848,932 A | 12/1998 | Adams |
| 5,851,149 A | 12/1998 | Xidos et al. |
| 5,863,041 A | 1/1999 | Boylan et al. |
| 5,871,400 A | 2/1999 | Yfantis |
| 5,876,284 A | 3/1999 | Acres et al. |
| 5,879,234 A | 3/1999 | Mengual |
| 5,923,885 A | 7/1999 | Johnson et al. |
| 5,930,369 A | 7/1999 | Cox et al. |
| 5,934,672 A | 8/1999 | Sines et al. |
| 5,941,947 A | 8/1999 | Brown |
| 5,951,639 A | 9/1999 | MacInnis |
| 5,954,583 A | 9/1999 | Green |
| 5,971,851 A | 10/1999 | Pascal et al. |
| 5,974,454 A | 10/1999 | Apfel |
| 5,991,399 A | 11/1999 | Graunke et al. |
| 5,999,740 A | 12/1999 | Rowley |
| 6,006,034 A | 12/1999 | Heath |
| 6,044,471 A | 3/2000 | Colvin |
| 6,047,129 A | 4/2000 | Frye |
| 6,071,190 A | 6/2000 | Weiss et al. |
| 6,074,435 A | 6/2000 | Rojestal |
| 6,099,408 A | 8/2000 | Schneier et al. |
| 6,104,815 A | 8/2000 | Alcorn et al. |
| 6,106,396 A | 8/2000 | Alcorn et al. |
| 6,135,887 A | 10/2000 | Pease |
| 6,149,522 A | 11/2000 | Alcorn et al. |
| 6,163,842 A | 12/2000 | Barton |
| 6,165,072 A | 12/2000 | Davis et al. |
| 6,195,587 B1 | 2/2001 | Hruska et al. |
| 6,203,427 B1 | 3/2001 | Walker et al. |
| 6,229,924 B1 | 5/2001 | Rhoads et al. |
| 6,243,480 B1 | 6/2001 | Zhao et al. |
| 6,253,374 B1 | 6/2001 | Dresevic et al. |
| 6,259,984 B1 | 7/2001 | Kanzaki et al. |
| 6,263,497 B1 | 7/2001 | Maeda |
| 6,264,557 B1 | 7/2001 | Schneier et al. |
| 6,264,561 B1 | 7/2001 | Saffari |
| 6,266,810 B1 | 7/2001 | Tanaka |
| 6,282,709 B1 | 8/2001 | Reha |
| 6,364,769 B1 | 4/2002 | Weiss et al. |
| 6,368,219 B1 | 4/2002 | Szrek et al. |
| 6,446,211 B1 | 9/2002 | Colvin |
| 6,446,257 B1 | 9/2002 | Pradhan et al. |
| 6,449,687 B1 | 9/2002 | Moriya |
| 6,453,319 B1 | 9/2002 | Mattis et al. |
| 6,454,648 B1 | 9/2002 | Kelly et al. |
| 6,460,142 B1 | 10/2002 | Colvin |
| 6,484,264 B1 | 11/2002 | Colvin |
| 6,496,808 B1 | 12/2002 | Aiello et al. |
| 6,502,195 B1 | 12/2002 | Colvin |
| 6,510,521 B1 | 1/2003 | Albrecht et al. |
| 6,527,638 B1 | 3/2003 | Walker et al. |
| 6,577,733 B1 | 6/2003 | Charrin |

| | | | |
|---|---|---|---|
| 6,595,856 B1 | 7/2003 | Ginsburg et al. | |
| 6,620,047 B1 | 9/2003 | Alcorn et al. | |
| 6,645,077 B2 | 11/2003 | Rowe | |
| 6,681,329 B1 | 1/2004 | Fetkovich et al. | |
| 6,685,567 B2 | 2/2004 | Cockerille et al. | |
| 6,722,985 B2 * | 4/2004 | Criss-Puszkiewicz et al. | 463/29 |
| 6,785,825 B2 | 8/2004 | Colvin | |
| 6,792,548 B2 | 9/2004 | Colvin | |
| 6,792,549 B2 | 9/2004 | Colvin | |
| 6,795,925 B2 | 9/2004 | Colvin | |
| 6,799,277 B2 | 9/2004 | Colvin | |
| 6,804,763 B1 | 10/2004 | Stockdale et al. | |
| 6,813,717 B2 | 11/2004 | Colvin | |
| 6,813,718 B2 | 11/2004 | Colvin | |
| 6,851,607 B2 | 2/2005 | Orus et al. | |
| 6,857,078 B2 | 2/2005 | Colvin | |
| 6,863,608 B1 * | 3/2005 | LeMay et al. | 463/24 |
| 6,875,110 B1 * | 4/2005 | Crumby | 463/42 |
| 6,931,630 B1 | 8/2005 | Cotner et al. | |
| 7,043,641 B1 | 5/2006 | Martinek et al. | |
| 7,099,479 B1 | 8/2006 | Ishibashi et al. | |
| 7,162,036 B2 | 1/2007 | Rowe | |
| 7,216,169 B2 | 5/2007 | Clinton et al. | |
| 7,237,717 B1 | 7/2007 | Rao et al. | |
| 7,506,195 B2 | 3/2009 | Takahashi et al. | |
| 7,581,256 B2 | 8/2009 | Cockerille et al. | |
| 2001/0011341 A1 | 8/2001 | Hayes, Jr. et al. | |
| 2002/0049909 A1 | 4/2002 | Jackson et al. | |
| 2002/0071557 A1 * | 6/2002 | Nguyen | 380/251 |
| 2002/0116615 A1 * | 8/2002 | Nguyen et al. | 713/168 |
| 2002/0165023 A1 * | 11/2002 | Brosnan et al. | 463/29 |
| 2003/0014639 A1 | 1/2003 | Jackson et al. | |
| 2003/0195033 A1 | 1/2003 | Gazdic et al. | |
| 2003/0028779 A1 | 2/2003 | Rowe | |
| 2003/0032485 A1 | 2/2003 | Cockerille | |
| 2003/0045353 A1 * | 3/2003 | Paulsen et al. | 463/40 |
| 2003/0073497 A1 | 4/2003 | Nelson | |
| 2003/0078103 A1 | 4/2003 | LeMay et al. | |
| 2003/0203755 A1 | 10/2003 | Jackson | |
| 2003/0203756 A1 | 10/2003 | Jackson | |
| 2003/0216172 A1 | 11/2003 | LeMay et al. | |
| 2004/0002381 A1 | 1/2004 | Alcorn et al. | |
| 2004/0068654 A1 | 4/2004 | Cockerille et al. | |
| 2004/0147314 A1 | 7/2004 | LeMay et al. | |
| 2004/0259633 A1 | 12/2004 | Gentles et al. | |
| 2005/0183143 A1 | 8/2005 | Anderholm et al. | |
| 2005/0192099 A1 | 9/2005 | Nguyen et al. | |
| 2006/0035713 A1 * | 2/2006 | Cockerille et al. | 463/42 |
| 2006/0036874 A1 | 2/2006 | Cockerille et al. | |
| 2006/0100010 A1 | 5/2006 | Gatto et al. | |
| 2006/0256965 A1 | 11/2006 | Rowe | |
| 2007/0298887 A1 | 12/2007 | Ryan | |
| 2008/0031452 A1 | 2/2008 | Rowe | |
| 2009/0282489 A1 | 11/2009 | Cockerille et al. | |

FOREIGN PATENT DOCUMENTS

| | | |
|---|---|---|
| DE | 4014477 | 7/1991 |
| EP | 0 685 246 A1 | 6/1995 |
| EP | 1 496 419 | 12/2005 |
| EP | 1 934 961 | 6/2008 |
| GB | 2072395 | 9/1981 |
| GB | 2202984 | 9/1981 |
| GB | 2121569 | 12/1983 |
| GB | 2201821 | 9/1988 |
| WO | WO 99/65579 | 12/1999 |
| WO | WO 00/33196 | 6/2000 |
| WO | WO 00/56058 | 9/2000 |
| WO | WO 01/16776 | 3/2001 |
| WO | WO 01/50230 | 7/2001 |
| WO | WO 01/57783 | 8/2001 |
| WO | WO 01/59689 | 8/2001 |
| WO | WO 01/77837 | 10/2001 |
| WO | WO 01/80169 | 10/2001 |
| WO | WO 01/99325 | 12/2001 |
| WO | WO 02/33954 | 4/2002 |
| WO | WO 02/088904 | 11/2002 |
| WO | WO 03/013677 | 2/2003 |
| WO | WO 2007/030404 | 3/2007 |

OTHER PUBLICATIONS

Defendants', Supplemental Response to Plaintiffs' First Set of Interrogatories filed in connection with Civil Action No. CV-S-01-1498, pp. 1-3,50-68 and 85-86.

Davida, G. et al., "Defending Systems Against Viruses through Cryptographic Authentication," Proceedings of the Symposium on Security and Privacy, *IEEE Comp. Soc. Press*, pp. 312-318 (May 1, 1989).

Document entitled "Fact Sheet on Digital Signature Standard" dated May 1994, 6 pages.

Federal Information Processing Standards (FIPS) Publication 180-1 entitled "Secure Hash Standard" dated Apr. 17, 1995, 2 title pages, abstract page and pp. 1-21.

Federal Information Processing Standards (FIPS) Publication 180 entitled "Secure Hash Standard" dated May 11, 1993, title page, abstract page and pp. 1-20.

Federal Information Processing Standards (FIPS) Publication 186 entitled "Digital Signature Standard (DSS)" dated Jan. 27, 2000, 17 pages.

Hellman, Martin E., "The Mathematics of Public-Key Cryptography," Scientific American, vol. 241, No. 8, Aug. 1979, pp. 146-152 and 154-157.

Rivest, et al., "A Method for Obtaining Digital Signatures and Public-Key Cryptosystems," Communications of the ACM, vol. 21, No. 2, Feb. 1978, pp. 120-126.

Bauspiess, et al., "Requirements for Cryptographic Hash Functions," *Computers and Security*, 5:427-437 (Sep. 11, 1992).

Complaint for patent infringement filed by Aristocrat Technologies, et al., dated Jan. 22, 2002, Civil Action No. CV-S-02-0091.

Bakhtiari et al., Cryptographic Hash Functionsl: A Survey, 1995, Centre for Computer Security Research, pp. 1-26.

Spielo Gaming International, www.spielo.com, Dec. 6, 2000.

Oracle Corporation, www.oracle.com/collateral/ent_partioning_fo.pdf, Feb. 1999.

Office Action, dated Jul. 18, 2007 for Australian Patent Application No. 2002326526.

Nguyen et al., "Secured Virtual Network in a Gaming Environment," U.S. Appl. No. 11/078,966, filed Mar. 10, 2005.

LeMay et al, "Gaming Machine Virtual Player Tracking and Related Services," U.S. Appl. No. 09/642,192, filed Aug. 18, 2000.

Brosnan, "Using a Gaming Machine as a Server," U.S. Appl. No. 09/595,798, filed Jun. 16, 2000.

Martinek, et al., "Encryption in a Secure Computerized Gaming System", U.S. Appl. No. 09/520,404, filed Mar. 8, 2000.

U.S. Notice of Allowance dated Jul. 11, 2003 issued in U.S. Appl. No. 09/925,098.

U.S. Office Action dated Jan. 29, 2003 issued in U.S. Appl. No. 09/925,098.

U.S. Office Action dated Oct. 3, 2002 issued in U.S. Appl. No. 09/925,098.

U.S. Notice of Allowance dated Apr. 16, 2009 issued in U.S. Appl. No. 10/680,041.

U.S. Office Action dated Dec. 10, 2008 issued in U.S. Appl. No. 10/680,041.

U.S. Final Office Action dated Feb. 13, 2008 issued in U.S. Appl. No. 10/680,041.

U.S. Office Action dated Jul. 20, 2007 issued in U.S. Appl. No. 10/680,041.

U.S. Notice of Allowance dated Aug. 31, 2006 issued in U.S. Appl. No. 09/927,313.

U.S. Notice of Allowance dated Apr. 20, 2006 issued in U.S. Appl. No. 09/927,313.

U.S. Final Office Action dated Nov. 17, 2005 issued in U.S. Appl. No. 09/927,313.

U.S. Office Action dated Apr. 5, 2005 issued in U.S. Appl. No. 09/927,313.

U.S. Office Action dated Oct. 30, 2009 issued in U.S. Appl. No. 11/888,324.
Gaming Standards Association, "Software Verification and Authentication in a Gaming Device", Feb. 15, 2000, www.gamingstandards.com (5 pages).
Schneier B.: "Applied Cryptography, Second Edition. Protocols, Algorithms, and Source Code in C" 1996, John Wiley & Sons, Inc. USA, XP002344241, pp. 446-449; pp. 458-459.
Menezes A., Van Oorschot P., Vanstone S.: "Handbook of Applied Cryptography" 1996, CRC Press, USA, XP002344242, pp. 365-366.
Benjamin Kosnik, "Notes on the codevt implmentation", Aug. 28, 2000, pp. 1-7.
Eddy Zwaneveld, "Definition of Lossless Cloning", Apr. 3, 2000, pp. 1-4.
Unknown author, "memcmp(3)—compare byte string", Jun. 4, 1993, pp. 1-4.
Unknown author, "bcmp(3)—byte string operations", Jun. 4, 1993, pp. 1-2.
AU Examiner's Fourth Report dated Sep. 11, 2009 issued in Application No. 2002326552.
AU Examiner's Second Report dated Jan. 12, 2009 issued in Application No. 2002326552.
AU Examiner's First Report dated Jul. 26, 2007 issued in Application No. 2002326552.
AU Withdrawl of Opposition dated Aug. 19, 2009 issued in Application No. 2002326526.
AU Statement of Grounds and Particulars dated Jan. 23, 2009 issued in Application No. 2002326526.
AU Notice of Opposition dated Nov. 6, 2008 issued in Application No. 2002326526.
Canadian Second Office Action dated Apr. 9, 2009 issued in 2,456,635.
Canadian First Office Action dated Jul. 10, 2008 issued in 2,456,635.
European Supplemental Search Report dated Aug. 23, 2006 issued in Application No. 02 761274.6.
European Examination Report dated Nov. 18, 2005 issued in Application No. 02761247.2.
European Search Report dated Sep. 28, 2005 issued in Application No. 01918440.7, 3 pages.
International Preliminary Examination Report dated Oct. 28, 2006 issued in Application No. PCT/US02/25083.
International Written Opinion dated Jun. 10, 2004 issued in Application No. PCT/US02/25083.
International Search Report dated Nov. 5, 2002 issued in Application No. PCT/US02/25083.
International Preliminary Examination Report dated Nov. 10, 2003 issued in PCT/US02/24882.
International Written Opinion dated Apr. 24, 2003 issued in Application No. PCT/US02/24882.
International Search Report dated Nov. 21, 2002 issued in Application No. PCT/US02/24882.
International Preliminary Report dated Mar. 20, 2008 issued in Application No. PCT/US2006/034366.
PCT Supplemental Search Report and Written Opinion dated Feb. 1, 2007 issued in PCT/US2006/034366.
European Examination Report dated Aug. 27, 2009 issued in Application No. 02 761274.6.
U.S. Office Action dated May 12, 2010 issued in U.S. Appl. No. 11/221,314.
Australian Examination Report dated Feb. 24, 2010 issued in Application No. 2008243153.
Canadian Examination Report mailed Jun. 1, 2010 in Application No. 2,456,759.

* cited by examiner

DIGITAL IDENTIFICATION OF UNIQUE GAME CHARACTERISTICS

RELATED APPLICATION DATA

The present application is a continuation application pursuant to 35 USC 120 from U.S. patent application Ser. No. 09/927,313, filed on Aug. 6, 2001 now U.S. Pat. No. 7,162,036, and entitled, "DIGITAL IDENTIFICATION OF UNIQUE GAME CHARACTERISTICS", the entirety of which is incorporated herein by reference for all purposes.

The present application relates generally to U.S. patent application Ser. No. 09/746,944 for GAMING TERMINAL DATA REPOSITORY AND INFORMATION DISTRIBUTION SYSTEM filed on Dec. 21, 2000, the entire disclosure of which is incorporated herein by reference for all purposes.

BACKGROUND OF THE INVENTION

This invention relates to gaming network including gaming machines such as video slot machines and video poker machines. More specifically, the present invention provides methods and apparatus for verifying the authenticity of distributed gaming applications having a plurality of associated gaming application objects.

Typically, a master gaming controller in a gaming machine controls various combinations of devices that allow a player to play a game on the gaming machine and encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

When implementing the gaming features described above on a gaming machine using architectures utilized in the personal computer industry, a number of requirements unique to the gaming industry must be considered. One such requirement is the regulation of gaming software. Typically, within a geographic area allowing gaming, i.e. a gaming jurisdiction, a regulatory body is charged with regulating the games played in the gaming jurisdiction to ensure fairness and prevent cheating. In most gaming jurisdictions there are stringent regulatory restrictions for gaming machines requiring a time consuming approval process of new gaming software and any software modifications to gaming software used on a gaming machine. A regulatory scheme also typically includes field verification of deployed gaming applications to ensure that a deployed game corresponds to the certified version of the game.

In the past, to implement the play of a game on a gaming machine, a monolithic software architecture has been used. In a monolithic software architecture, a single gaming software executable is developed. The single executable is typically burnt into an EPROM and then submitted to various gaming jurisdictions for approval. After the gaming application is approved, a unique checksum is determined for the gaming application stored in the EPROM for the purpose of uniquely identifying the approved version of the gaming application.

A disadvantage of a monolithic programming architecture is that a single executable that works for many different applications can be quite large. For instance, gaming rules may vary from jurisdiction to jurisdiction. Thus, either a single custom executable can be developed for each jurisdiction or one large executable with additional logic can be developed that is valid in many jurisdictions. The customization process may be time consuming and inefficient. For instance, upgrading the gaming software may require developing new executables for each jurisdiction, submitting the executables for reapproval, and then replacing or reprogramming EPROMs in each gaming machine.

By contrast, software architectures for use by personal computers have moved toward an object oriented approach where different software objects may be dynamically linked together prior to or during execution to create many different combinations of executables that perform different functions. Thus, for example, to account for differences in gaming rules between different gaming jurisdictions, gaming software objects appropriate to a particular gaming jurisdiction may be linked at run-time which is simpler than creating a single different executable for each jurisdiction. Also, object oriented software architectures simplify the process of upgrading software since a software object, which usually represent only a small portion of the software, may be upgraded rather than the entire software.

However, object oriented software architectures are not compatible with the traditional gaming industry approach of storing static executables in EPROMs. As a result, the gaming software regulation process described above using EPROM checksums is largely inapplicable to the future of the gaming industry. That is, regulators in the gaming industry employ a device know as a "Cobatron" which they use to generate the checksum for an EPROM which is actually physically removed from a randomly selected gaming machine. Because the checksum uniquely identifies the gaming application stored in the EPROM, the regulator can verify that the application in the selected gaming machine is the application certified by the gaming commission, thus ensuring the integrity of the gaming machine.

Obviously, this approach is not applicable to a distributed gaming environment in which a gaming application may correspond to a collection of objects, some of which are downloaded to the gaming machine from a remote server or the Internet. Therefore, as gaming technology moves toward more distributed architectures, there is a need for techniques by which gaming applications corresponding to multiple objects may be uniquely identified for regulatory and other purposes.

SUMMARY OF THE INVENTION

In accordance with the several embodiments of the present invention, various methods, systems and computer program products are disclosed for authenticating a first gaming application adapted for deployment at a first gaming machine that is operable to receive a wager on a game of chance. A first gaming application signature is accessed. In at least one embodiment, the first gaming application signature is associated with a first portion of a first plurality of gaming objects that are associated with the first gaming application. Additionally, the first gaming application signature may uniquely represent the first gaming application. In at least some embodiments, the first gaming application signature may be generated using the first portion of the first plurality of gaming objects. A first certified gaming signature associated with the first gaming application may also be accessed. Authentication of the first gaming application may be performed. In at least one embodiment, the first gaming application may be authenticated, for example, by comparing at least one gaming application signature with at least one certified gaming signature. If it is determined that the first gaming application is not authentic, the first gaming application signature may be analyzed to identify at least one invalid gaming object.

According to specific embodiments, the first gaming application signature may include an original signature which, for example, may be stored for authentication of subsequently generated signatures corresponding to deployed gaming applications at the gaming machine. In one embodiment, the first gaming application signature may correspond to a deployed gaming application. In one embodiment, the first gaming application may be determined to not be authentic in response to detecting a noncompliance condition relating to the authentication of the first gaming application. According to one embodiment, if a noncompliance condition is detected relating to the authentication of the first gaming application, one or more actions may be initiated to identify invalid and/or inauthentic gaming objects. According to specific embodiments, such actions may include, for example comparing the first gaming application signature and/or at least one of the object signatures to one or more previously stored original and/or certified signature(s).

Additional features and advantages of the various aspects of the present invention will become apparent from the description of its preferred embodiments, which description should be taken in conjunction with the accompanying drawings.

DETAILED DESCRIPTION OF SPECIFIC EMBODIMENTS

According to the present invention, methods and apparatus are provided by which a gaming application corresponding to a plurality of software objects may be uniquely identified. According to a specific embodiment, unique signatures for at least some of the objects corresponding to a gaming application are combined to create a unique ID by which a regulator may verify that the certified version of the gaming application is the one which has been deployed. According to various specific embodiments, the unique signatures for the individual objects may include conventionally generated digital signatures for audio, video, graphic, and other objects. These signatures may then be combined in a wide variety of ways to generate the unique ID.

The digital signatures by which each object associated with a gaming application is identified may be generated using any of a wide variety of conventional or proprietary techniques. For example, a digital signature for an audio file may be generated using audio sampling techniques such as those described in U.S. Pat. No. 6,243,480 (Zhao et al.), the entire disclosure of which is incorporated herein by reference for all purposes. Similarly, a digital signature for a video file may be generated using techniques described in U.S. Pat. No. 6,229,924 (Rhoads et al.), the entire disclosure of which is incorporated herein by reference for all purposes. Digital water marks such as those described in U.S. Pat. No. 6,163,842 (Barton), the entire disclosure of which is incorporated herein by reference for all purposes, may be embedded in the various objects associated with a gaming application. These water marks could then be extracted, combined, and compared to a similarly created signature associated with the authorized version of the gaming application. Alternatively, proprietary algorithms may be created which generate a unique data structure corresponding to the object in question. Even conventional checksum algorithms may be applied to the objects to generate individual checksums which may then be combined to create the unique ID.

The method by which these individual object signatures are combined can similarly employ any of a wide variety of mechanisms. Such mechanisms may include, for example, a simple logic function, e.g., an exclusive-OR, more complex logic functions, any of a variety of standard checksum or hashing function algorithms, or any technique which generates a unique data structure for the combination of signatures.

Figure 1A:
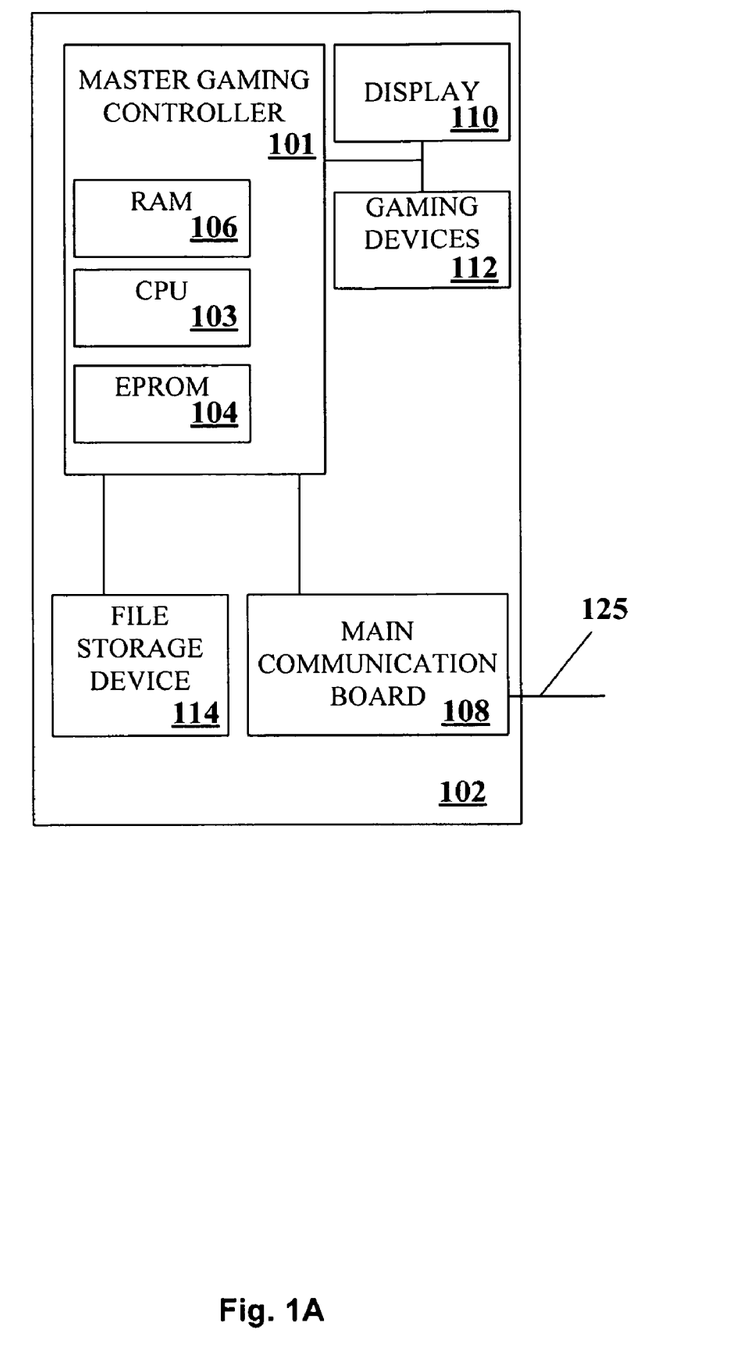
FIG. 1A is block diagram of a gaming machine.

FIG. 1A is block diagram of a gaming machine 102 for use with one embodiment of the present invention. A master gaming controller 101 is used to present one or more games on the gaming machine 102. The master gaming controller 101 executes a number of gaming software programs to operate gaming devices 112 such as coin hoppers, bill validators, coin acceptors, speakers, printers, lights, displays (e.g. 110) and input mechanisms. One or more displays, such as 110, may be used on the gaming machine. The one or more displays may be mechanical displays (e.g., slot reels), video displays or combinations thereof. The master gaming controller 101 may execute gaming software enabling complex graphical renderings to be presented on one or more displays that may be used as part of a game outcome presentation on the gaming machine 102. The master gaming controller 101 may also execute gaming software enabling communications with gaming devices located outside of the gaming machine 102, such as player tracking servers and progressive game servers. In some embodiments, communications with devices located outside of the gaming machine may be performed using the main communication board 108 and network connection 125.

In conjunction with various embodiments of the present invention, gaming software executed on the gaming machine 102 by the master gaming controller 101 may be regularly verified by comparing software stored in RAM 106 for execution on the gaming machine 102 with certified copies of the software stored on the gaming machine, accessible to the gaming machine via a remote communication connection or combinations thereof. Two gaming software units are used to implement this method: 1) a code comparator and 2) a code authenticator. The code comparator compares at least some portion of the gaming software scheduled for execution on the gaming machine at a particular time with authenticated gaming software stored in a file storage media accessible to the gaming machine 102. The file storage media may comprise one or more file storage devices located on the gaming machine 102, on other gaming machines, on remote servers or combinations thereof. During operation of the gaming machine, the code comparator periodically checks the gaming software programs being executed by the master gaming controller 101 as the gaming software programs executed by the master gaming controller 101 may vary with time.

The code authenticator locates on the file storage media an authentic copy of the gaming software being checked by the code comparator. During the boot process for the gaming machine 102 the code authenticator may be loaded from an EPROM such as 104. The master gaming controller 101 executes various gaming software programs using one or more processors such as CPU 103. During execution, a software program may be temporarily loaded into the RAM 106. Depending on the current operational state of the gaming machine, the number and types of software programs loaded in the RAM 106 may vary with time. For instance, when a game is presented, particular software programs used to present a complex graphical presentation may be loaded into RAM 106. However, when the gaming machine 102 is idle, these graphical software programs may not be loaded into the RAM.

The code authenticator searches a file system available to the gaming machine for certified/authentic copies of gaming software programs currently being executed by the gaming machine. The file system may be distributed across one or more file storage devices. The certified/authentic copies of gaming software programs may be certified after a regulatory approval process as described above. The certified/authentic copies of gaming software programs may be stored in a "static" mode (e.g. read-only) on one or more file storage devices located on the gaming machine 102 such as file storage device 114 or EPROM 104. The file storage devices may be a hard-drive, CD-ROM, CD-DVD, static RAM, flash memory, EPROMs or combinations thereof.

Figure 1B:
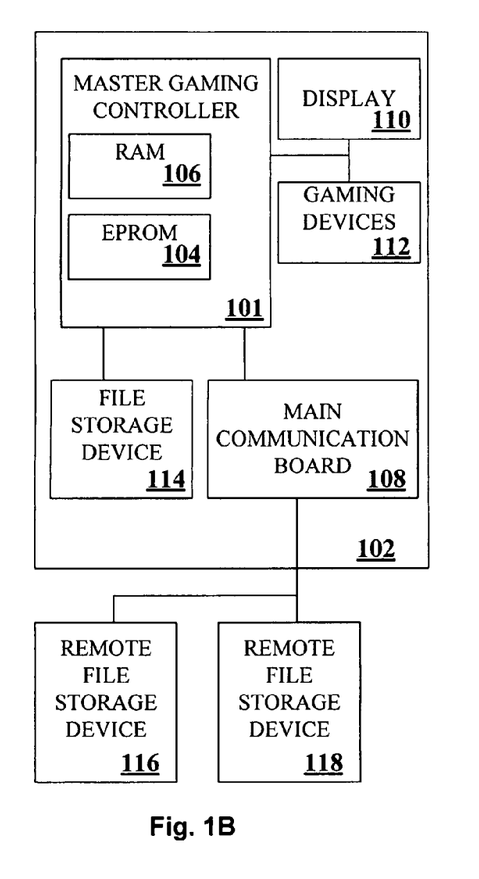
FIGS. 1B and 1C are block diagrams of gaming machines connected to remote storage devices.
Figure 1C:
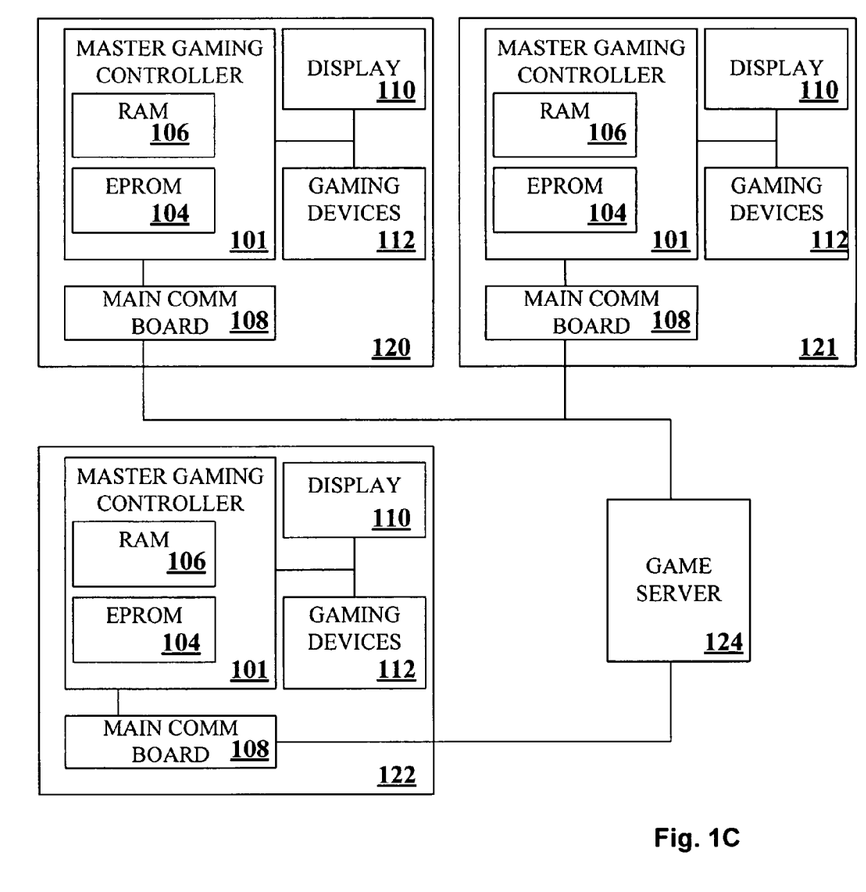

The file system used by the code authenticator may be distributed between file storage devices located on the gaming machine or on remote file storage devices. FIGS. 1B and 1C are block diagrams of gaming machines connected to remote storage devices. In FIG. 1B, gaming machine 102 is connected to two remote file storage devices 116 and 118. The code authenticator may search the two remote file storage devices 116 and 118 as well as local file storage device 114 for gaming software programs that correspond to gaming software programs currently scheduled for execution by the master gaming controller 101. Using a resource sharing system, a number of gaming software programs may be simultaneously scheduled for execution on the gaming machine at any one time. The resource sharing system, usually embedded in the operating system, develops a sequence order for executing the combination of gaming software programs. When the code authenticator returns a file name and file location (e.g. one of the file storage devices), the code comparator may compare portions of the software program being executed on the gaming machine with a corresponding software program stored one of the file storage devices. The gaming software programs identified by the code authenticator may be in an executable "object" format that includes programming instructions substantially identical to the format of the programming instructions executing on the gaming machine.

According to a specific embodiment of the present invention, a majority of gaming software programs used on the gaming machine are stored on a remote device such as a game server. In FIG. 1C, three gaming machines, 120, 121 and 122 are connected to a game server 124. In this example, the gaming machines 120, 121 and 122 do not include a local file storage device such as a hard drive and gaming executables are downloaded from the game server 124. On each of the gaming machines 120, 121 and 122, the code comparator may compare software being executed by the gaming machine with certified/authentic code stored on the game server 124.

Figure 2:
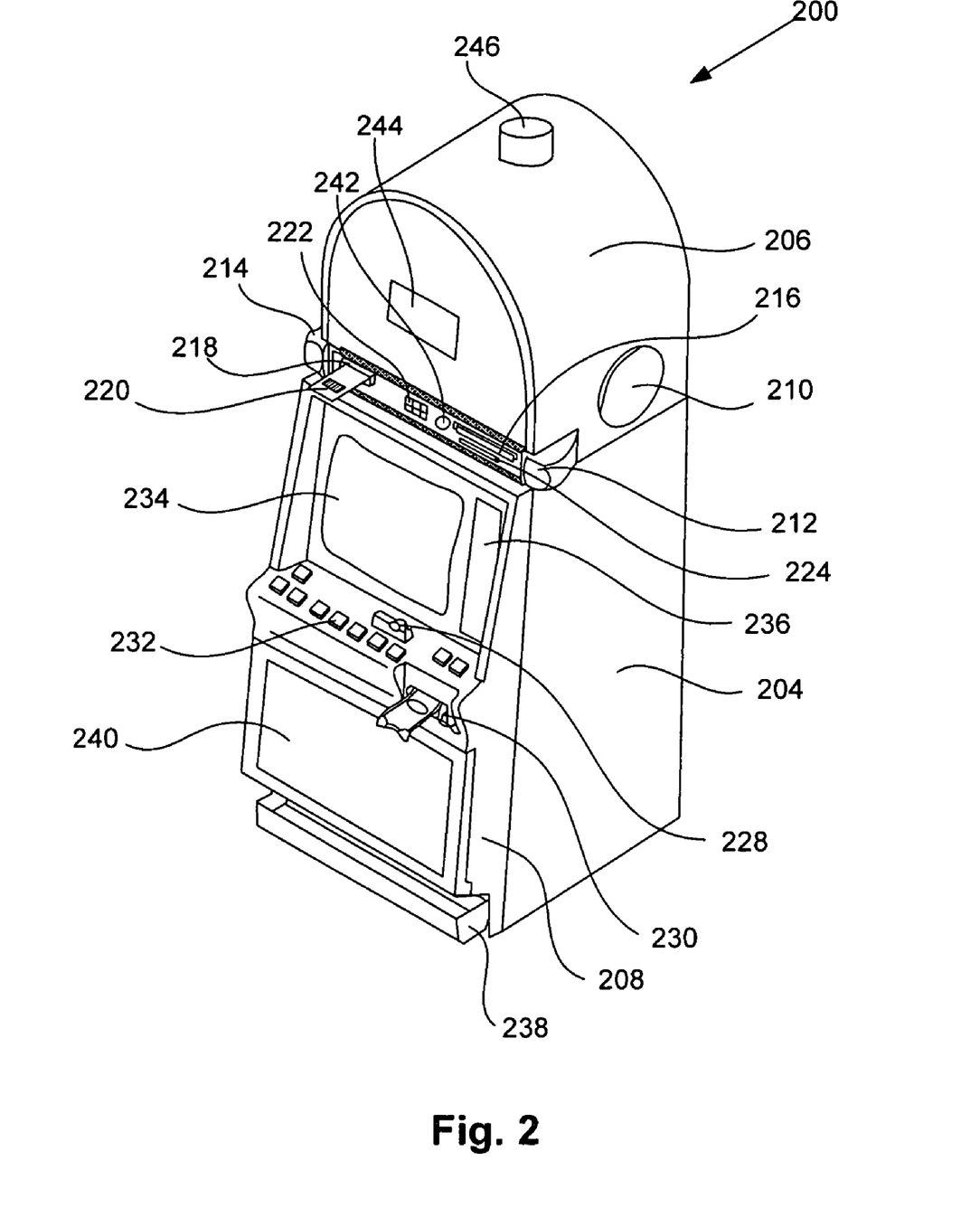
FIG. 2 is a perspective drawing of a gaming machine having a top box and other devices.

Turning to FIG. 2, a video gaming machine 200 for use with specific embodiments of the present invention is shown. Machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 240. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, a game denomination (e.g. $0.25 or $1). The bill validator 230, player-input switches 232, video display monitor 234, and information panel are devices used to play a game on the game machine 200. The devices are controlled by circuitry (See FIG. 1A) housed inside the main cabinet 204 of the machine 200. Many possible games, including mechanical slot games, video slot games, video poker, video black jack, video pachinko, video bingo, video card games, lottery, and other games of chance may be provided with gaming machines of this invention.

The gaming machine 200 includes a top box 206, which sits on top of the main cabinet 204. The top box 206 houses a number of devices, which may be used to add features to a game being played on the gaming machine 200, including but not limited to: a) speakers 210, 212, 214, a ticket printer 218 which prints bar-coded tickets 220, b) a key pad 222 for entering player tracking information such as an identification code, c) a fluorescent display 216 for displaying player tracking information, d) a card reader 224 for entering a magnetic striped card containing player tracking information or other input devices for entering player tracking information, e) a speaker/microphone for voice commands and voice recognition, f) biometric input devices such as finger printer for identifying a player, g) a video display screen 244 for displaying various types of video content such as player tracking information, machine status, bonus games and primary games and h) a lighted candle that may be used for signaling purposes such as to get the attention of various casino personnel. In some embodiments, some of these gaming devices may also be incorporated into the main cabinet of the gaming machine 200. The ticket printer 218 may be used to print tickets for a cashless ticketing system. Further, the top box 206 may house different or additional devices than those shown. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (See FIG. 1A) housed within the main cabinet 204 of the machine 200.

It should be noted that that gaming machine 200 is but one example from a wide range of gaming machine designs with which the present invention may be practiced. For example, not all suitable gaming machines have top boxes or player tracking features. Further, some gaming machines have two or more game displays—mechanical and/or video. And, some gaming machines are designed for bar tables and have displays that face upwards. As another example, a game may be generated on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 2, when a user wishes to play the gaming machine 200, he or she inserts cash through the coin acceptor 228 or bill validator 230. Additionally, the bill validator may accept a printed ticket voucher which may be accepted by the bill validator 230 as an indicia of credit when a cashless ticketing system is used. At the start of the game, the player may enter playing tracking information using the card reader 224, the keypad 222, and the fluorescent display 216. Further, other game preferences of the player playing the game may be read from a card inserted into the card reader. During the game, the player views game information using the video display 234. Other game and prize information may also be displayed in the video display screen 244 located in the top box 206.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 232, the video display screen 234 or using some other device which enables a player to input information into the gaming machine. In some embodiments, the player may be able to access various game services such as concierge services and entertainment content services using the video display screen 234 and one more input devices.

During certain game events, the gaming machine 200 may display visual and auditory effects that can be perceived by the player. These effects add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240. After the player has completed a game, the player may receive game tokens from the coin tray 238 or the ticket 220 from the printer 218, which may be used for further games or to redeem a prize. Further, the player may receive a ticket 220 for food, merchandise, or games from the printer 218.

Figure 3:
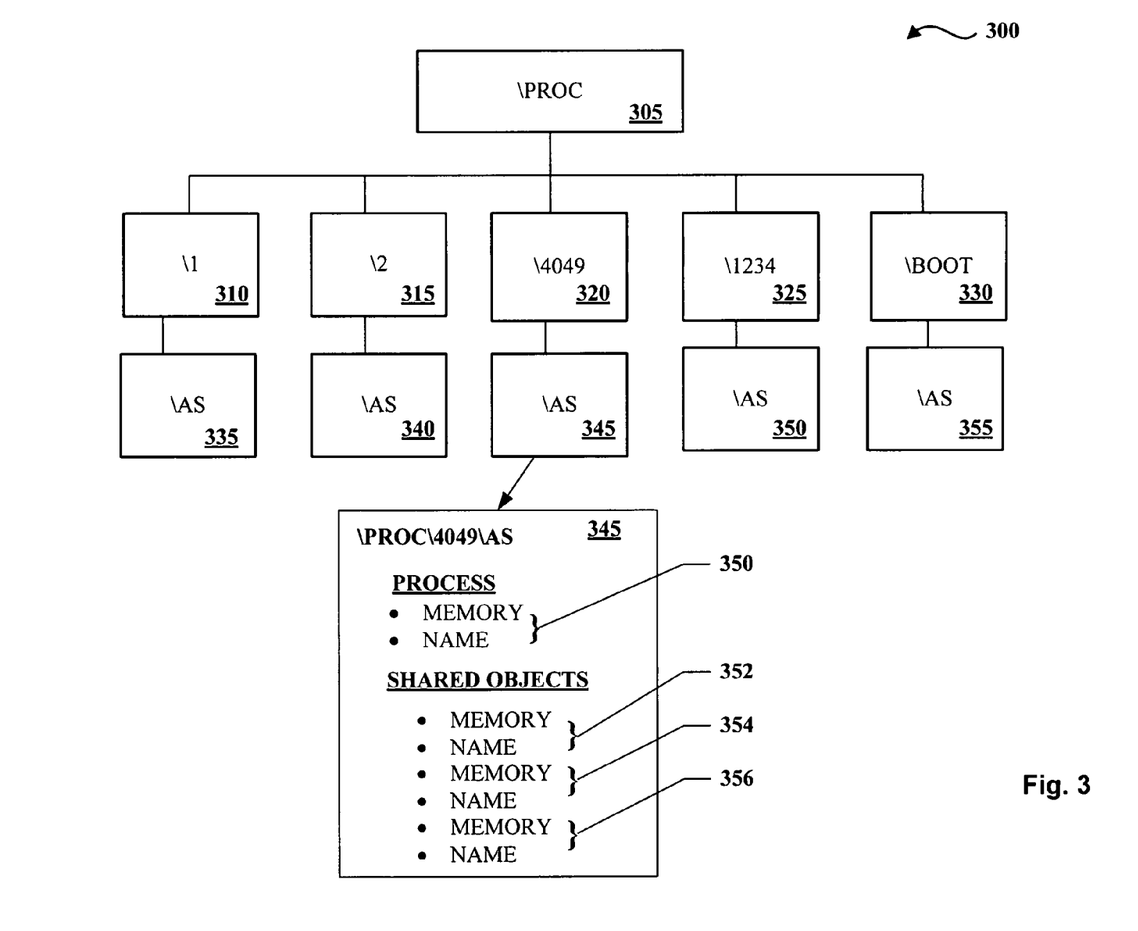
FIG. 3 is a block diagram of a gaming process file structure.

FIG. 3 is a block diagram of a gaming process file structure 300. As a player utilizes a gaming machine in the manner described above, many different software programs may be executed by the gaming machine. As different gaming software programs are executed by the gaming machine, an operating system running on the gaming machine assign the programs memory location in RAM and then schedule and track the execution of each program as "processes."

In one example, every time a process is launched in the operating system, a special directory, such as 310, 315, 320, 325 and 330, is created under the directory "/proc" 305 (e.g. the process directory) in the operating system. The name of this directory is identical to the process ID number (PID) of the process. For instance, process directories corresponding to process ID numbers "1", "2", "4049", "1234" and "6296" are stored under the "/proc" 305 directory. The process directories listed under the "/proc" directory 305 may vary as a function of time as different processes are launched and other process are completed.

In one embodiment, under each PID directory, such as 310, 315, 320, 325 and 330, an address space (AS) file, titled "AS", may be stored. The AS files, such as 335, 340, 345, 350 and 355 may contains various information about its parent process. Items stored in this file may include, among other things, the command line name used to launch the program and it's location in RAM (e.g. 350) and the names and location in RAM of the shared objects (so) that the process uses (e.g. 352, 354 and 356). A shared object is a gaming software program that may be shared by a number of other gaming software programs.

The shared objects used by a process on the gaming machine may vary with time. Thus, the number of shared objects such as 352, 354 and 356 used by a process may vary with time. For instance, a process for a game presentation on a gaming machine may launch various graphical shared objects and audio shared objects during the presentation of a game on the gaming machine and various combinations of these shared objects may be used at various times in the game presentation. For example, a shared object for a bonus game presentation on the gaming machine may only be used when a bonus game is being presented on the gaming machine. Hence, a process for a bonus game presentation may be launched when a bonus game presentation is required and the process may terminate when the bonus game presentation is completed. When the game presentation process uses the bonus game presentation shared object, the launching and the termination of the bonus game presentation shared object may be reflected in the AS file for the game presentation process.

The code comparator may use the AS files to determine which game related processes are currently being executed on the gaming machine. The code comparator may also be a process designated in the "/proc" directory 305. Also, in the "/proc" directory there may exist one or more directories that are not representations of process Ids. These include, but are not limited to, SELF, boot 330, ipstats, mount, etc. When parsing the "/proc" directory, these directories are skipped as they do not represent game related code. Once a valid directory is found, e.g., "4049" 320, it is opened and the "AS" file in it may parsed.

During the gaming application certification process, the regulating body, e.g., the gaming commission, generates the gaming application signature against which the signatures of gaming applications operating in the field are subsequently measured. According to various embodiments of the present invention, a software program is employed to both generate the original gaming application signature and perform field comparisons between the original signature and signatures generated in the field.

Figure 4:
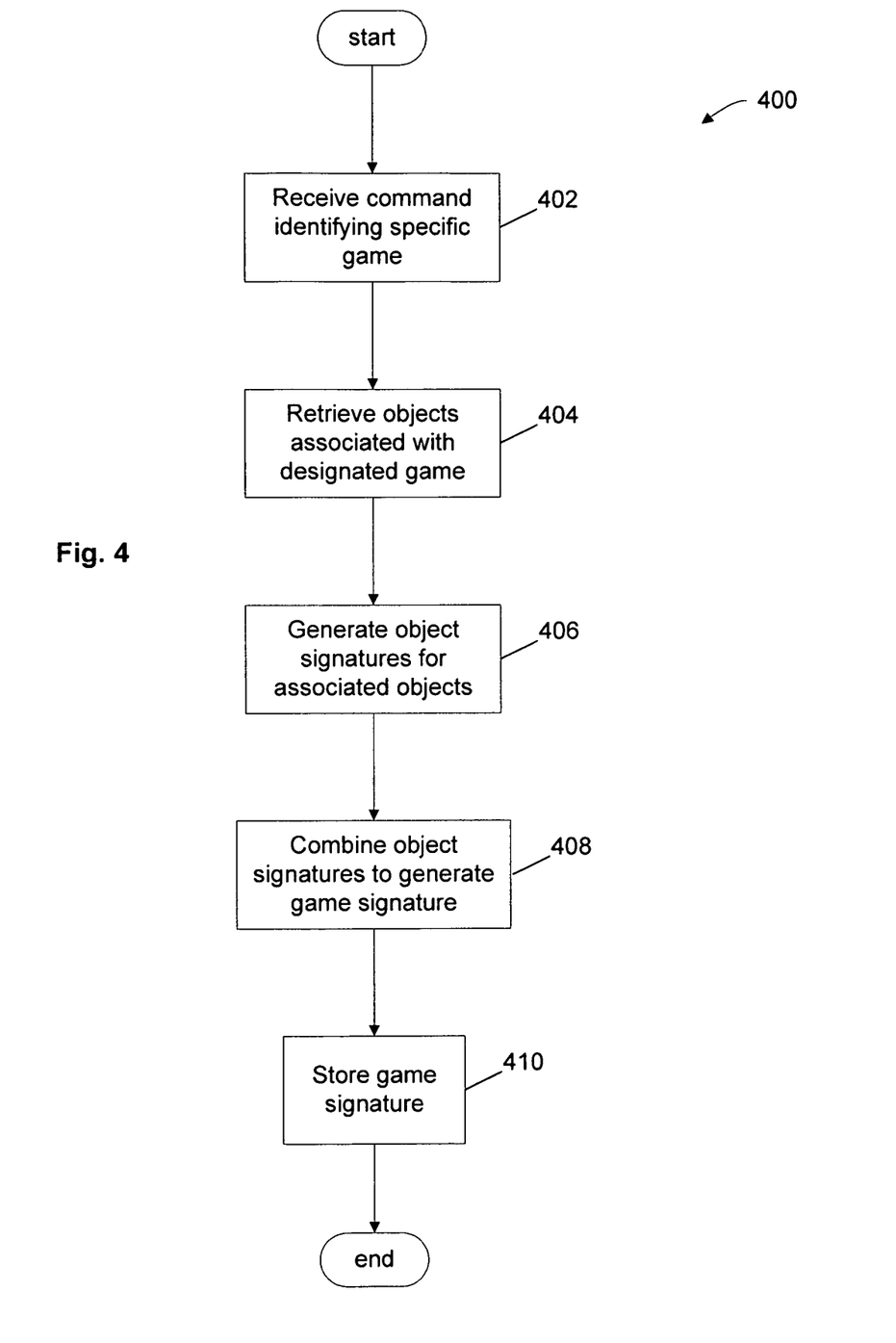
FIG. 4 is a flow chart illustrating an exemplary process by which an original gaming application signature may be generated.

FIG. 4 is a flowchart 400 illustrating an exemplary process by which an original gaming application signature may be generated. To generate the original signature, the representative of the gaming commission enters a game-specific command in a user interface (402) which causes some or all of the objects or software modules associated with the designated game to be retrieved (404). These objects may be identified and retrieved, for example, as described above with reference to FIGS. 1B and 1C and the code authenticator. Such objects may include, for example, a core gaming application object, an audio object, a video object, a graphics object, a pay table object, etc. The user interface may provide access, for example, to a gaming application server on which the objects are stored. Alternatively, the user interface may provide access to multiple machines on a network amongst which the objects are distributed as described above with reference to FIGS. 1B and 1C.

An object signature is generated for each of the retrieved objects according to one or more of a variety of techniques (406). For example, a standard checksum might be generated for the core gaming application object, a proprietary data structure for the pay table object, and conventional digital signatures for the audio and video objects as described above. It should be noted that, according to some embodiments, object signatures may only be generated for some subset of all of the objects associated with a gaming application. That is, only some of the objects associated with the gaming application might be retrieved for this purpose.

The generated object signatures are then combined to form the gaming application signature (408). As mentioned above, this may be achieved using any of a wide variety of conventional and proprietary techniques. That is, the object signatures may be combined using a simple logic function such as an exclusive-OR, or a more complicated logic function using a combination of logic operations. Alternatively, a hashing function may be applied to the object signatures to generate the signature. As another alternative, a proprietary technique may be employed to combine the signatures into a unique data structure.

The gaming application signature is then stored for subsequent authentication of versions of the corresponding game in the field (410). That is, only gaming applications having the same signature will be considered in compliance with the gaming commission's certification scheme.

Figure 5:
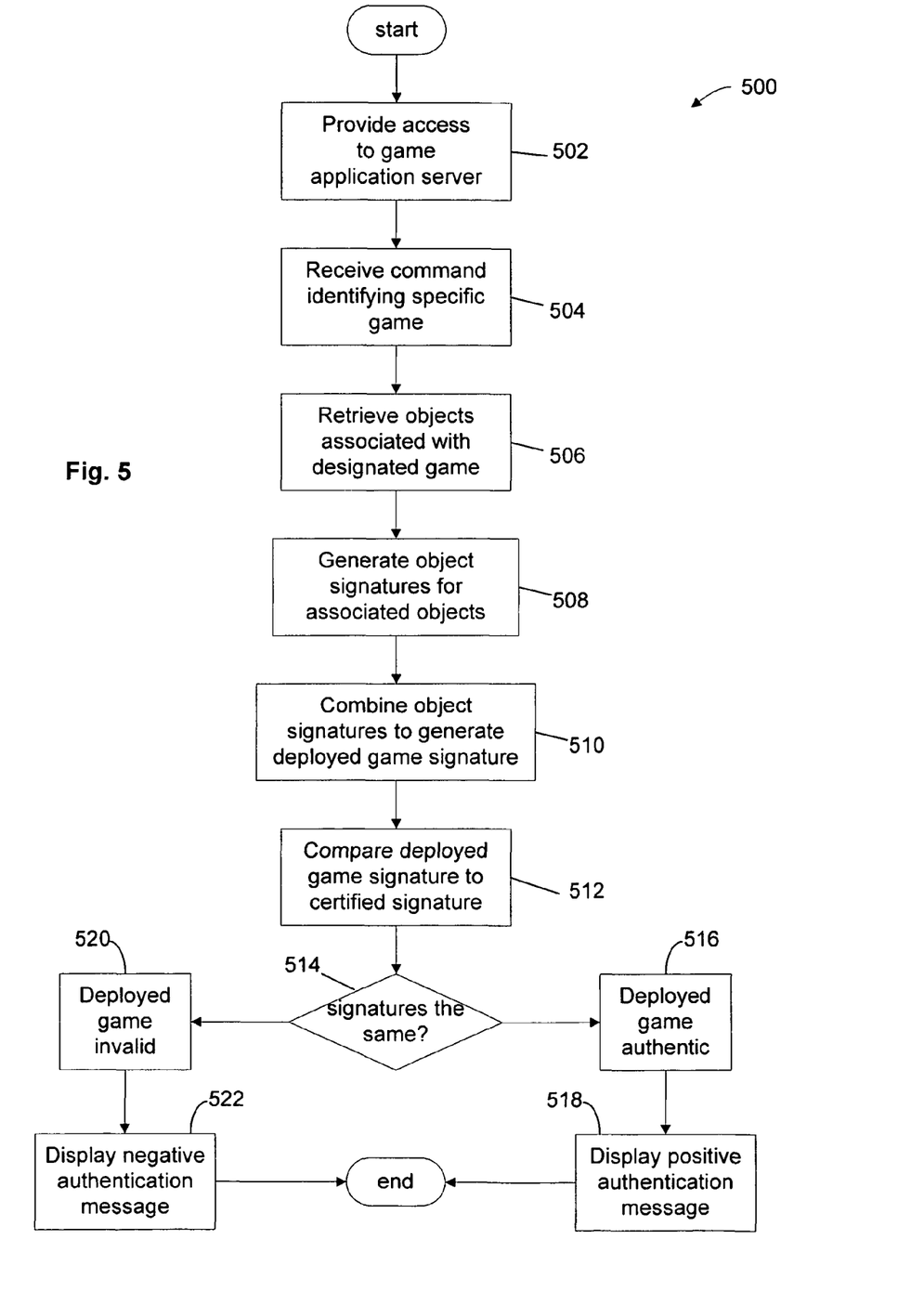
FIG. 5 is a flow chart illustrating an exemplary process by which a previously generated gaming application signature is used to authenticate a corresponding gaming application deployed in the field.

FIG. 5 is a flowchart 500 illustrating an exemplary process by which a previously generated gaming application signature is used to authenticate a corresponding gaming application deployed in the field. In response to a visit by a gaming industry regulator to a gaming establishment, access to the establishment's gaming application server (e.g., server 124 of FIG. 1C) is typically provided for the purpose of verifying compliance with the applicable gaming regulations (502). This access may be direct, i.e., via the network administrator's terminal, or indirect, e.g., via a particular gaming machine or other node on the establishment's gaming network.

Once access is provided, the regulator begins execution of the authentication process of the present invention by booting certified game authentication software and entering a game-specific command identifying the particular gaming application for which authentication is desired (504). In response to the command, some or all of the objects or software modules associated with the designated game are retrieved (506). As mentioned above, a process similar to the code authenticator described above could facilitate the identification and retrieval of these objects which may include, for example, a core gaming application object, an audio object, a video object, a graphics object, a pay table object, etc. The objects may be retrieved, for example, from a gaming application server on which the objects are stored. Alternatively, the objects may be retrieved from multiple machines on the network amongst which the objects are distributed, e.g., the gaming application server and a specific gaming machine.

An object signature is generated for each of the retrieved objects according to one or more of a variety of techniques as described above (508). The generated object signatures are then combined to form a signature corresponding to the deployed gaming application (510). As mentioned above, this may be achieved using any of a wide variety of conventional and proprietary techniques.

The deployed gaming application signature is then compared to the previously stored original gaming application signature which corresponds to the version of the game certified by the gaming commission (512). If the comparison determines the signatures to be the same (514), the deployed gaming application is determined to be authentic (516) and an appropriate message is displayed (518). If, on the other hand, the comparison determines the signatures to be different (514), the deployed gaming application is determined to be an uncertified or invalid version of the game (520) and an appropriate message is displayed (522).

According to a specific embodiment, where the process of FIG. 5 determines the deployed gaming application to be invalid, the regulator may look at the individual object signatures and compare each to the corresponding component of the original certified signature to determine which of the objects associated with the gaming application represent the noncompliance condition.

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to particular gaming machine and gaming network architectures. However, it will be understood that the present invention may be implemented in a wide variety of gaming environments without departing from the scope of the invention. That is, a personal computer connected with a gaming server via the Internet is an appropriate environment in which the present application may be practiced. More generally, the present invention is equally applicable to a single property, e.g., a casino, gaming environment and an virtual gaming environment provided over a wide area network such as the Internet.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for authenticating a first gaming application adapted for deployment at a first gaming machine, the first gaming machine being operable to receive a wager on a game of chance, the method comprising:
   accessing a pre-generated first gaming application signature, the first gaming application signature being associated with a first portion of a first plurality of gaming objects associated with the first gaming application, the first gaming application signature uniquely representing the first gaming application;
   accessing a first certified gaming signature associated with the first gaming application;
   authenticating the first gaming application by comparing the first gaming application signature with the first certified gaming signature; and
   analyzing, in response to a determination that the first gaming application is not authentic, the first gaming application signature to identify at least one invalid gaming object.

2. The method of claim 1 further comprising:
generating, using the first portion of the first plurality of gaming objects, the first gaming application signature.

3. The method of claim 1 further comprising:
generating an object signature for each of the first portion of the first plurality of gaming objects;
wherein the generating of the object signatures comprises at least one of: generating a checksum from a corresponding one of the first plurality of gaming objects, applying a hashing function to a portion of a corresponding one of the first plurality of gaming objects, generating an audio file signature, generating a video file signature, and extracting a digital water mark.

4. The method of claim 1 further comprising:
generating an object signature for each of the first portion of the first plurality of gaming objects; and
combining the object signatures to generate the first gaming application signature;
wherein the combining of the object signatures comprises at least one of: combining the object signatures using at least one logic function, applying a hashing function to the object signatures, and generating a checksum from the object signatures.

5. The method of claim 1 further comprising:
analyzing individual object signatures associated with the first portion of the first plurality of gaming objects to identify at least one invalid gaming object.

6. The method of claim 1 wherein the certified gaming signature includes a plurality of certified gaming objects, the method further comprising:
generating a separate object signature for selected objects of the first portion of the first plurality of gaming objects; and
comparing a first certified gaming object to a corresponding object signature of the first portion of the first plurality of gaming objects in order to identify at least one invalid gaming object.

7. The method of claim 1 further comprising:
detecting a noncompliance condition relating to the authentication of the first gaming application; and
analyzing, in response to detection of the noncompliance condition, the first gaming application signature to identify at least one invalid gaming object associated with the noncompliance condition.

8. The method of claim 1:
wherein the first gaming application is deployed at the first gaming machine; and
wherein the first portion of the first plurality of gaming objects are deployed at the first gaming machine.

9. The method of claim 1 further comprising wherein the first portion of the first plurality of gaming objects correspond to gaming objects deployed at the first gaming machine.

10. The method of claim 1 wherein the first plurality of gaming objects are stored in at least one network node of a network, and wherein the first portion of the first plurality of gaming objects are retrieved from the at least one network node via the network.

11. The method of claim 1 wherein the first plurality of gaming objects are stored on a gaming application server.

12. The method of claim 1 wherein the first gaming application signature comprises an original signature, the method further comprising:
storing the original signature for authentication of subsequently generated signatures corresponding to deployed gaming applications.

13. The method of claim 1 wherein the first gaming application signature corresponds to a deployed gaming application, the method further comprising:
comparing the first gaming application signature to a previously stored original signature to authenticate the first gaming application.

14. The method of claim 13 further comprising:
generating an object signature for each of the first portion of the first plurality of gaming objects; and
comparing at least one of the object signatures to a corresponding object signature associated with the previously stored original signature where the first gaming application is determined to be not authentic.

15. The method of claim 1 wherein the first plurality of gaming objects includes one or more objects selected from a group including: a core gaming object, an audio object, a video object, a graphics object, a pay table object, and a non-core gaming object.

16. The method of claim 1:
wherein the first plurality of gaming objects are stored in at least one of: a gaming application server and a gaming machine in a network; and
wherein the first portion of the first plurality of gaming objects are retrieved via one of:
the gaming application server and the gaming machine in the network.

17. A system for authenticating a first gaming application adapted for deployment at a first gaming machine, the first gaming machine being operable to receive a wager on a game of chance, the system comprising:
at least one processor;
at least one interface operable to provide a communication link to at least one other network device in the data network; and
memory;
the system being operable to:
access a pre-generated first gaming application signature, the first gaming application signature being associated with a first portion of a first plurality of gaming objects associated with the first gaming application, the first gaming application signature uniquely representing the first gaming application;
access a first certified gaming signature associated with the first gaming application;
authenticating the first gaming application by compare the first gaming application signature with the first certified gaming signature; and
analyze, in response to a determination that the first gaming application is not authentic, the first gaming application signature to identify at least one invalid gaming object.

18. The system of claim 17 being further operable to:
generate, using the first portion of the first plurality of gaming objects, the first gaming application signature.

19. The system of claim 17 being further operable to:
generate an object signature for each of the first portion of the first plurality of gaming objects;
wherein the generating of the object signatures comprises at least one of: generating a checksum from a corresponding one of the first plurality of gaming objects, applying a hashing function to a portion of a corresponding one of the first plurality of gaming objects, generating an audio file signature, generating a video file signature, and extracting a digital water mark.

20. The system of claim 17 being further operable to:
generate an object signature for each of the first portion of the first plurality of gaming objects; and combine the object signatures to generate the first gaming application signature;

wherein the combining of the object signatures comprises at least one of: combining the object signatures using at least one logic function, applying a hashing function to the object signatures, and generating a checksum from the object signatures.

21. The system of claim 17 being further operable to:

analyze individual object signatures associated with the first portion of the first plurality of gaming objects to identify at least one invalid gaming object.

22. The system of claim 17 wherein the certified gaming signature includes a plurality of certified gaming objects, the system being further operable to:

generate a separate object signature for selected objects of the first portion of the first plurality of gaming objects; and compare a first certified gaming object to a corresponding object signature of the first portion of the first plurality of gaming objects in order to identify at least one invalid gaming object.

23. The system of claim 17 being further operable to:

detect a noncompliance condition relating to the authentication of the first gaming application; and analyze, in response to detection of the noncompliance condition, the first gaming application signature to identify at least one invalid gaming object associated with the noncompliance condition.

24. The system of claim 17:

wherein the first gaming application is deployed at the first gaming machine; and wherein the first portion of the first plurality of gaming objects are deployed at the first gaming machine.

25. The system of claim 17:

wherein the first portion of the first plurality of gaming objects correspond to gaming objects deployed at the first gaming machine.

26. The system of claim 17 wherein the first plurality of gaming objects are stored in at least one network node of a network, and wherein the first portion of the first plurality of gaming objects are retrieved from the at least one network node via the network.

27. The system of claim 26 wherein the first plurality of gaming objects are stored on a gaming application server.

28. The system of claim 17 wherein the first gaming application signature corresponds to a deployed gaming application, the system being further operable to:

compare the first gaming application signature to a previously stored original signature to authenticate the first gaming application.

29. The system of claim 28 being further operable to:

generate an object signature for each of the first portion of the first plurality of gaming objects; and compare at least one of the object signatures to a corresponding object signature associated with the previously stored original signature where the first gaming application is determined to be not authentic.

30. The system of claim 17 wherein the first plurality of gaming objects includes one or more objects selected from a group including: a core gaming object, an audio object, a video object, a graphics object, a pay table object, and a non-core gaming object.

31. The system of claim 17:

wherein the first plurality of gaming objects are stored in at least one of: a gaming application server and a gaming machine in a network; and wherein the first portion of the first plurality of gaming objects are retrieved via one of:

the gaming application server and the gaming machine in the network.

32. A system for authenticating a first gaming application adapted for deployment at a first gaming machine, the first gaming machine being operable to receive a wager on a game of chance, the system comprising:

means for accessing a pre-generated first gaming application signature, the first gaming application signature being associated with a first portion of a first plurality of gaming objects associated with the first gaming application, the first gaming application signature uniquely representing the first gaming application;

means for accessing a first certified gaming signature associated with the first gaming application;

means for authenticating the first gaming application by comparing the first gaming application signature with the first certified gaming signature; and means for analyzing, in response to a determination that the first gaming application is not authentic, the first gaming application signature to identify at least one invalid gaming object.

* * * * *